(12) United States Patent
Holden et al.

(10) Patent No.: US 8,061,382 B2
(45) Date of Patent: Nov. 22, 2011

(54) SANITARY VALVE ASSEMBLY (76) Inventors: Dwayne Holden, Springfield, MO (US);
Gerald Glass, Springfield, MO (US);
Drew Holden, Springfield, MO (US)

( * ) Notice: Subject to any disclaimer, the term of this patent is extended or adjusted under 35 U.S.C. 154(b) by 376 days.

(21) Appl. No.: 12/323,107

(22) Filed: Nov. 25, 2008

(65) Prior Publication Data

US 2009/0145487 A1 Jun. 11, 2009

Related U.S. Application Data (60) Provisional application No. 60/991,480, filed on Nov. 30, 2007, provisional application No. 61/014,336, filed on Dec. 17, 2007.

(51) Int. Cl.
*F16K 17/04* (2006.01)
(52) U.S. Cl. .................... 137/542; 137/315.04; 137/469
(58) Field of Classification Search .................. 137/469, 137/542, 557, 315.04
See application file for complete search history.

(56) References Cited

U.S. PATENT DOCUMENTS

| | | | | |
|---|---|---|---|---|
| 2,069,645 | A * | 2/1937 | Cardew | 137/469 |
| 2,634,748 | A * | 4/1953 | Morrison | 137/542 |
| 3,422,840 | A * | 1/1969 | Bryant et al. | 137/469 |
| 4,168,723 | A * | 9/1979 | Schneider | 137/542 |
| 4,273,151 | A * | 6/1981 | Nezworski | 137/115.17 |
| 4,782,850 | A * | 11/1988 | Duffy et al. | 137/557 |
| 5,623,962 | A * | 4/1997 | Danzy et al. | 137/469 |
| 6,668,853 | B2 * | 12/2003 | Dean | 137/315.04 |

* cited by examiner

Primary Examiner — Kevin Lee
(74) Attorney, Agent, or Firm — Richard P. Stitt; Polsinelli Shughart PC (57) ABSTRACT A reusable sanitary valve assembly with a releasable cap or cover that disengages from the valve indicating an over-pressure situation has occurred, the cap or cover is capable of being reset, and once it is known that gas, liquid or other contaminants have possibly entered the valve following an over-pressure situation, the interior of the valve can be inspected by removing a portion of the valve while the valve remains sealed on a pressurized substrate and, if the interior of the valve is contaminated, the interior of the valve can be cleaned and closed without unseating the valve.

9 Claims, 5 Drawing Sheets

SANITARY VALVE ASSEMBLY

CROSS-REFERENCE TO RELATED APPLICATIONS

This application claims priority under 35 U.S.C. 119(e) and 37 C.F.R. 1.78(a)(4) based upon copending U.S. Provisional Application Ser. No. 60/991,480 for Apparatus for Novel Sanitary Valve Assembly filed Nov. 30, 2007 and to U.S. Provisional Application Ser. No. 61/014,336 for Apparatus for Novel Sanitary Valve Assembly filed Dec. 17, 2007 and which specifications are incorporated herein by reference.

FIELD OF THE INVENTION

The present invention relates to valve assemblies, and more particularly to sanitary valve assemblies having adjustable pressure relief mechanisms, removable lids or tops that may be reset when an overpressure situation has occurred and removable parts to provide access to the interior of the valve without having to disengage the valve from the pressurized substrate.

BACKGROUND

The use of valve assemblies to relieve pressure is well known in the art. For example, U.S. Pat. No. 1,124,203 to Bingley discloses a safety valve suitable for use in connection with the brake cylinder of an air brake apparatus that prevents excessive pressure in the brake cylinder such as might result in the locking of car wheels.

U.S. Pat. No. 1,891,119 to Stover discloses a safety valve designed to relieve pressure in a vessel, such as the cylinder of a compressor when excessive pressure accumulates therein.

U.S. Pat. No. 2,254,209 to Buttner discloses a pressure relief valve that prevents the accumulation of fluid under or behind a sealing member in a valve.

U.S. Pat. No. 2,297,378 to Wittenberg discloses a pressure control and indicator gauge for use in connection with pressure cookers.

U.S. Pat. No. 2,710,627 to Wagner, et al. discloses a pressure controlling cap structure which vents any excess pressure within a cooker vessel.

U.S. Pat. No. 3,189,040 to Johnson discloses a spring loaded pressure relief valve.

U.S. Pat. No. 3,651,827 to Hammer, et al. discloses a pressure relief valve that is connected on one side to a high pressure of a fluid or hydraulic or lubricating system and on the other side to a low pressure side.

U.S. Pat. No. 4,049,017 to Jones discloses a pressure relief valve having a sealing member which is capable of moving into and out of sealing engagement with a valve seat as the valve member slides in the passageway.

U.S. Pat. No. 4,140,148 to Richter discloses a sanitary pressure relief valve with drain ports.

U.S. Pat. No. 4,143,787 to Walker discloses an air vent pressure relief plug for use with pressure cookers.

U.S. Pat. No. 4,889,151 to Oten discloses a pressure relief valve having a valve member that smacks and permanently deforms a deformable over pressure indicating element to give a permanent indication of an over pressure situation.

U.S. Pat. No. 5,623,962 to Danzy, et al. discloses a pressure relief valve having an inlet port and an outlet.

U.S. Pat. No. 6,668,853 to Dean discloses a pressure relief valve for use in highly corrosive environments having parts exposed to corrosive lading which are relatively easily field-replaceable.

While the prior art discloses a myriad of pressure relief valves, various industries using tanks, pipes and other various forms of closed containers that move or store liquid and gas are continuously looking to improve existing valve assemblies and their design. Innovation for improved valve assemblies is partly a result of the desire for less complicated, less costly and more effective ways to relieve and detect too much pressure in a valve assembly.

Some industries, such as the food and beverage industry, sometimes require sanitary conditions in the transport or storage of semi-solid food or liquid beverages. As such, sanitary pressure valves that prevent the contamination of goods or items held or transported in a closed system while also relieving overpressure situations is an absolute necessity.

Therefore, it may also be desirable to have a pressure relief valve assembly that allows a user to adjust the pressure needed to activate the pressure relief feature of the valve. This feature is useful because a closed system such as a tank may be used to transport or store a variety of gases and liquids. Because different liquids and gases create varying pressure conditions in a closed system, it would be desirable to have a pressure relief valve assembly that is adjustable.

In some situations, a valve assembly may accumulate build-up or residue from gas or liquid that remain on its surface. To avoid such build-up or residue, it would be desirable and advantageous to have a valve assembly that allows easy access and cleaning of the interior chamber of a closed valve assembly. Further, it is desirable and advantageous to have a valve assembly that can be accessed, inspected and cleaned without having to remove valve assembly from the pressurized vessel or substrate, keeping the vessel or substrate in a pressurized state while examining the interior of the valve assembly.

In other situations, it may be necessary to know when a closed system has exceeded a certain pressure level. For example, in a closed system with pipes, an overpressure situation may indicate a blockage in the system. Therefore, it would be advantageous to have a valve assembly with a visual cue that alerts a user that a certain pressure has been exceeded in the system. Furthermore, it would be useful if the valve assembly allowed a user to reset the visual cue that indicated the overpressure situation in the first place. A visual cue that may be reset is desirable because a new valve assembly would not be needed to replace the existing valve assembly. Simply resetting the visual cue on the valve assembly would allow its continued use.

Pressure relief valves are required in many instances because, for example, beverages may be infused with gases such as $CO_2$ or subjected to various temperature extremes. Gases and varying temperatures in a closed system cause pressure differentials. Without pressure relief valves, explosions and injuries to people around such closed systems would occur in the event the pressure level in a closed system exceeded the closed system's capacity.

Accordingly, there is a need for an adjustable sanitary valve assembly that relieves pressure and displays some visual cue that a certain pressure has been exceeded in a closed system. There is a also a need for a sanitary valve assembly that allows a user to manually adjust the pressure needed to activate the pressure relief mechanism of the valve assembly. Further, there is a need for a valve assembly that allows the user to access and inspect the interior of the assembly without removing and/or unsealing the valve from the vessel or substrate. Finally, there is a need for a low cost and effective sanitary valve assembly that can be efficiently cleaned and reused.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as representative bases for teaching one skilled in the art to variously employ the present invention in virtually any appropriately detailed structure.

Figure 1:
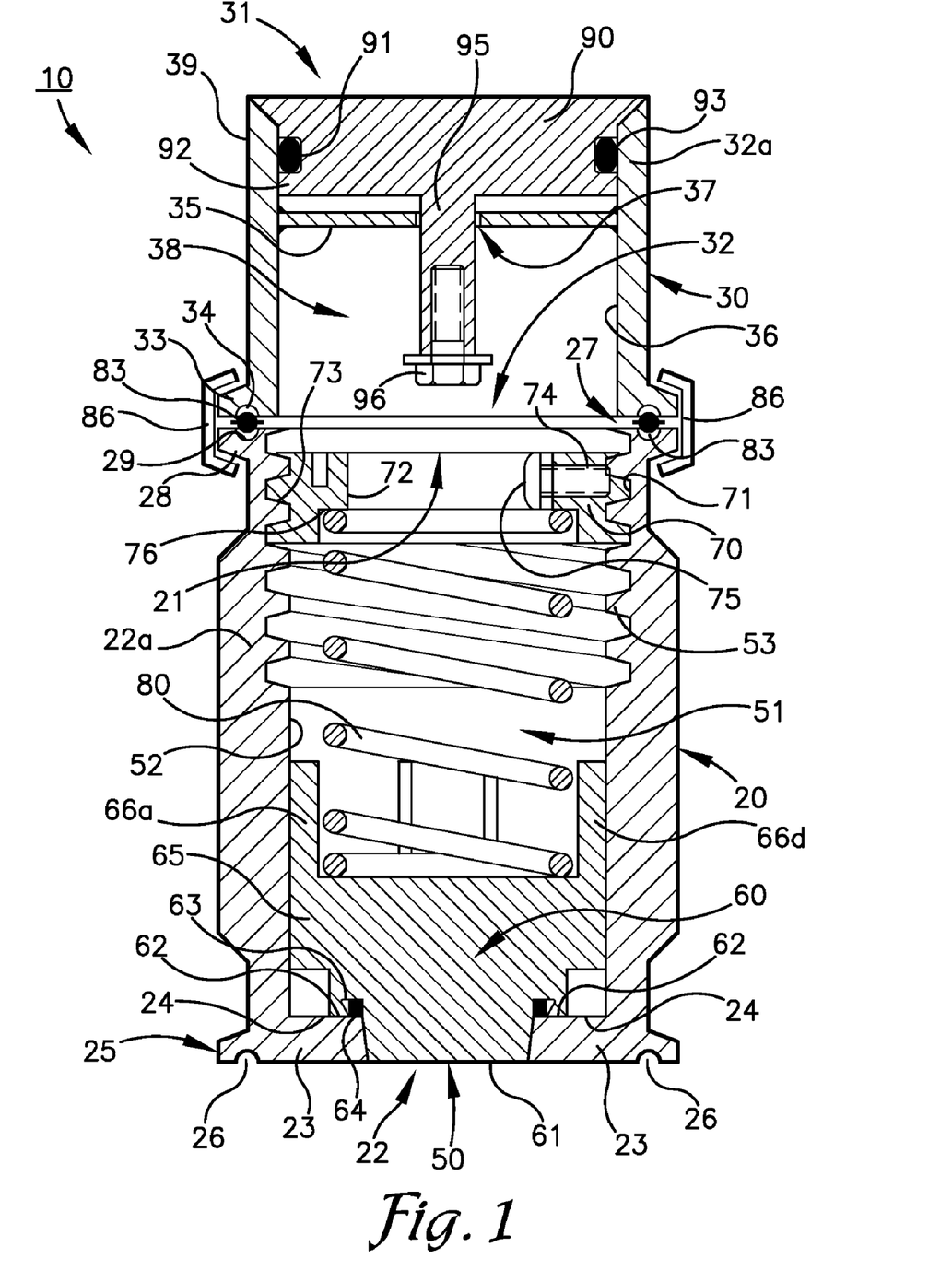
FIG. 1 is a cross section of an embodiment of a sanitary valve assembly.
Figure 2:
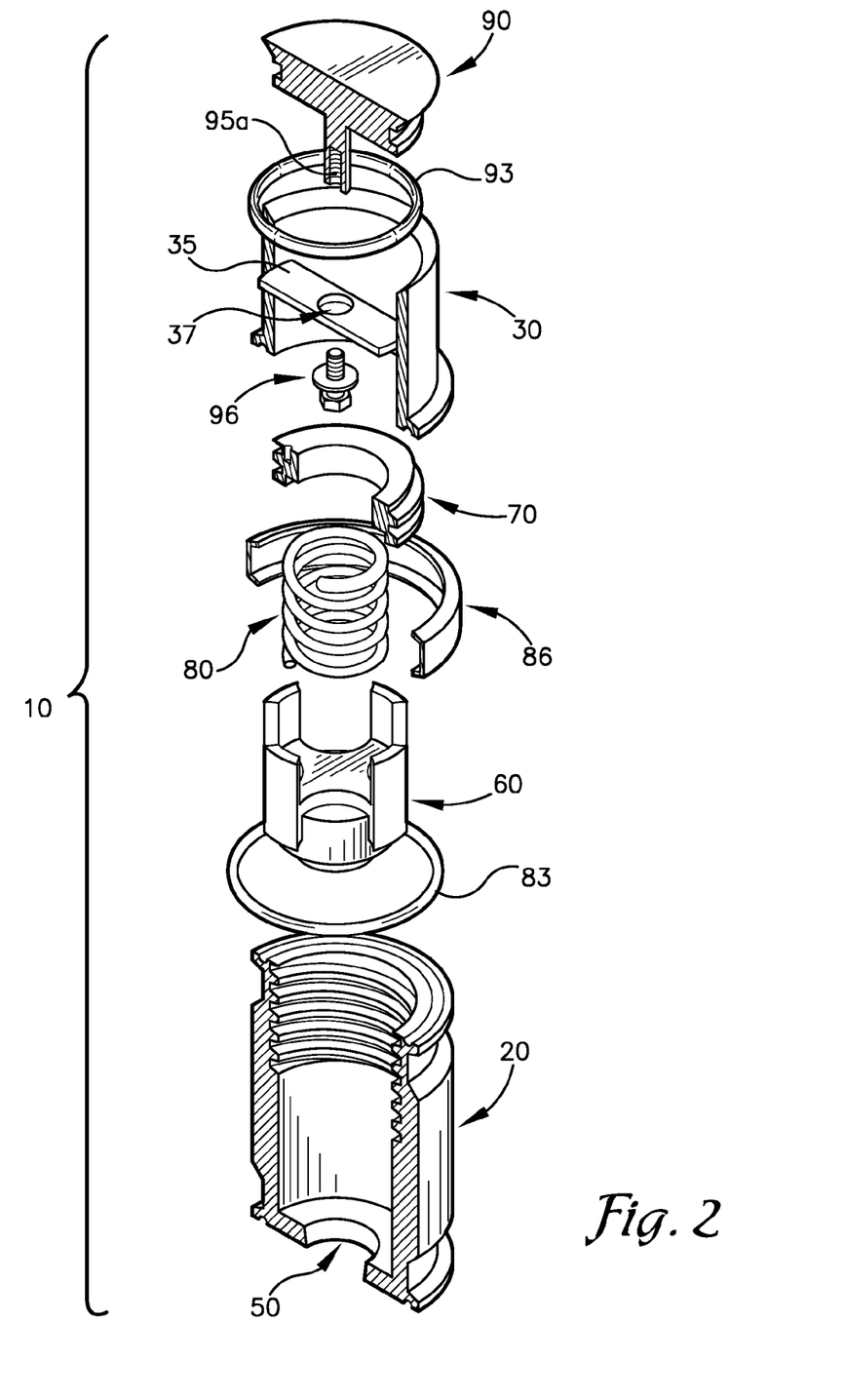
FIG. 2 is an exploded view of the cross section of the embodiment of the valve assembly of FIG. 1 and showing the valve assembly in its separable sections to allow cleaning of the valve while it is in use on a substrate.

First referring to FIGS. 1 and 2, a valve assembly 10 according to one embodiment as shown. The valve assembly comprising a valve body or a bottom body 20 and a pressure release body or top body 30. The valve body 20 and the pressure release body 30 are generally cylindrical in shape and may be made of any suitable material including, without limitation, metal such as steel, or plastic such as polycarbonate depending on the application needed for the valve assembly 10. The valve body 20 is generally cylindrical and hollow and has a top opening 21 and a bottom opening 22 with a continuous sidewall 22a connecting said valve body top opening 21 and said valve body bottom opening 22. The pressure release body 30 is generally cylindrical and hollow and has a top opening 31 and bottom opening 32 with a continuous sidewall 32a connecting said pressure release body top opening 31 and said pressure release body bottom opening 32. The valve body top opening 21 is connected to the pressure release body bottom opening 32 by a connecting means 86 such as a clamp, a brace, a collar, a band, or any other suitable means of connection.

The valve body 20 has a bottom or bottom surface 23 that is comprised of a valve seat 24, a bottom annular lip 25 and a bottom annular groove 26. The bottom surface 23 contains a port 50 that communicates from the outside of the valve body 20 to the interior or passageway 51 of the valve body 20. The bottom annular lip 25 provides a means of connecting the valve body 20 and therefore the valve assembly 10 to a substrate or vessel, such as a container or other pressurized or non-pressurized structure. The bottom annular groove 26 holds an O-ring or gasket creating a sealing engagement between a substrate and the valve assembly 10 or the valve body 20.

The valve body top surface 27 is comprised of a top annular lip 28 and a top annular groove 29. The interior side wall 52 of the valve body 20 has a plurality of threads 53 extending from the valve body top opening 21 toward the valve body bottom opening 22.

The interior 51 of the valve body 20 is comprised of a guide cylinder 60 a cap ring 70 and a means of creating force or spring 80 between the cap ring 70 and the guide cylinder 60. In one embodiment a spring comprises force means 80 and any other suitable means such as a spring loaded cylinder may be substituted.

Figure 3:
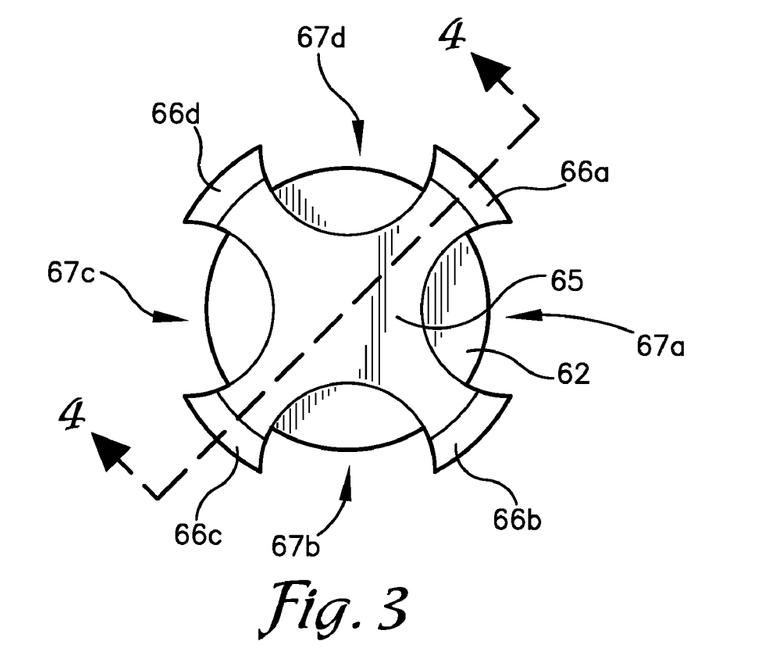
FIG. 3 is a top plan view of the guide cylinder of the valve assembly of the one embodiment of FIG. 1.
Figure 4:
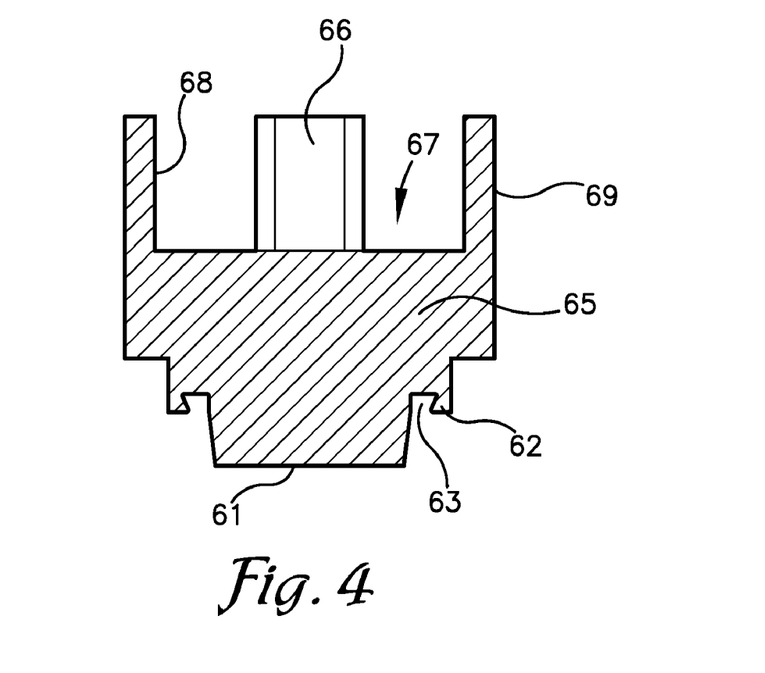
FIG. 4 is cross-section view of the guide cylinder taken along line 4-4 of FIG. 3.

Referring now to FIGS. 1 and 3 and 4, the guide cylinder 60 within the valve body 20 is comprised of a round bottom surface 61 that fills the port 50 and is generally flush with the valve body bottom surface 23; an annular second level surface 62 with a diameter larger than the round bottom surface 61 having an annular groove 63 with a means for creating a seal 64 such as an O-ring or gasket that is in contact with the valve seat 24; and a top surface 65 having extending therefrom, arcuate portions side walls 66 *a-d* of the guide cylinder 60 which are spaced apart by voids 67 *a-d*. The arcuate portions 66 interior side walls 68 and top surface 65 receive the spring 80, to bias guide cylinder 60 against valve seat 24. The arcuate portions 66 exterior side walls 69 mate against the interior side wall 52 of the valve body 20.

The cap ring 70 is a cylindrical tube having an outer surface 71 and an inner surface 72. The outer surface 71 of the cap ring 70 has threads 73 which compliment the thread 53 on the interior side wall 52 of the valve body 20. By inserting the cap ring 70 into the top opening 21 of the valve body 20, the cap ring 70 can move up or down with respect to valve interior surface 51 by turning the cap ring 70 clockwise or counter-clockwise as required by threads 53 and 73. The cap ring 70 contains a screw void 74 that extends from the inner surface 72 to the outer surface 71. A screw 75 is placed within the screw void 74 from the inner surface 72 toward the outer surface 71. The screw 75 is used to secure the cap ring 70 in a given position by tightening the screw 75 against interior side wall 52 of the valve body 20. The cap ring 70 has a seat 76 which receives the top portion of the spring 80.

The amount of pressure required to move the guide cylinder 60 such that the second surface 62 of the guide cylinder 60 is unseated from the valve seat 24 can be either decreased or increased by altering the force of the means of creating force 80. The force created by the spring 80 is increased or decreased by moving the cap ring 70 either towards the bottom opening 22 of the valve body 20 or towards the top opening 21 of the valve body 20. The cap ring 70 moves by turning the cap ring 70 on threads 53 on the interior surface 51 of the valve body 20. Compliment threads 73 on the outer surface 71 of the cap ring 70 operate such that turning of the cap ring 70 either clockwise or counterclockwise moves the cap ring 70 towards the bottom opening 22 of the valve body 20 thereby increasing the force on the guide cylinder 60 or moves the cap ring 70 towards the top opening 21 of the valve body 20 thereby decreasing the force on the guide cylinder 60.

Referring now to FIGS. 1 and 2, the pressure release body 30 with a top opening 31 and a bottom opening 32. The bottom opening 32 of the pressure release body 30 has a bottom annular lip 33 and a bottom annular groove 34. The bottom annular groove 34 of the pressure release body 30 aligns with the top annular groove 29 of the valve body 20 such that a means for creating a sealing engagement 83, such as an O-ring or gasket is placed between the bottom annular groove 34 of the pressure release body 30 and the top annular groove 29 of the valve body 20. A stop bar 35 extends diametrically across interior side walls 36 of the pressure release body 30. The stop bar 35 is secured to the interior side wall 36 of the pressure release body 30. The width of the stop bar 35 does not extend laterally but allows void areas between the stop bar 35 and the side wall 36 to allow matter and gas to flow from the bottom opening 32 of the pressure release body 30 through the top opening 31 of the pressure release body 30. The stop bar 35 has a void 37 which may be any shape or size but which is shown as being circular.

The bottom annular lip 33 of the pressure release body 30 aligns with the top annular lip 28 of the valve body 20. A connecting means 86 for securing the pressure release body 30 to the valve body 20 is attached or connected to the aligned annular lips 33, 28, the connecting means 86 could be a clamp or a band or a collar or a brace or any other suitable means. The connecting means 86 is removable allowing the pressure release body 30 and the valve body 20 to be separated. When attached, the pressure release body 30 and the valve body 20 create an alignment such that the interior of the valve body 51 directly communicates with the interior of the pressure release body 38 such that the flow of matter entering the valve assembly 10 through the port 50 can move unobstructed through the valve body 20 and the pressure release body 30 and exit the top opening 31 of the pressure release body 30.

A seal cap 90 is fitted on the top opening 31 of the pressure release body 30. The seal cap 90 can fit into the interior 38 of the pressure release body 30 or can fit like a cap covering the top opening 31 of the pressure release body 30 and extending over a portion of the exterior surface 39 of the pressure release body 30. An annular groove 91 is provided on surface 92 of the seal cap 90 which is frictionally fitted inside of the top opening 31 of the pressure release body 30. A means for creating a sealing engagement 93 is placed within the annular groove 91 of the seal cap 90. When the seal cap 90 is placed within the top opening 31 of the pressure release body 30 a frictional seal is created between the means for creating of sealing engagement 93 and the interior side wall 36 of the pressure release body 30. If the seal cap 90 was designed to extend over the top opening 31 and encircle the exterior surface 39 of the pressure release body 30 then the annular groove 91 would be placed such that the means for creating a sealing engagement 93 created a frictional seal against the exterior surface 39 of the pressure release body 30.

Seal cap 90 is provided with projection 95 that extends toward the bottom opening 32 of the pressure release body 30. The projection 95, as shown in FIG. 2, is a tube having a threaded inner void 95a and is shaped to extend through void 37 of the stop bar 35. When the seal cap 90 is fitted inside the top opening 31 of the pressure release body 30 as shown, the projection 95 extends through the void 37 such that the distal portion of the projection 95 is located between the stop bar 35 and the bottom opening 32 of the pressure release body 30.

On the distal end of the projection 35 is a stopping means 96. The stopping means 96 is wider in diameter than the void 37 of the stop bar 35. In a preferred embodiment stopping means 96 is a void threaded screw or rod inserted into the projection 95. The head of the threaded screw or rod is a larger diameter than the void 37 of the stop bar 35.

When the seal cap 90 is frictionally held in place within the top opening 31 of the pressure release body 30, any substance which enters the valve assembly 10 through the port 50 with a pressure that is greater than the frictional force of the seal cap 90 will cause the seal cap 90 to be ejected out of the top opening 31 of the pressure release body 30. The stopping means 96 of the seal cap 90 will prevent the seal cap 90 from being completely ejected from the pressure release body 30 since the stopping means 96 exceeds the size of the void 37 of the stop bar 35. In this manner seal cap 90 provides visual cue that an over-pressure situation had occurred if it is observed that the seal cap 90 is not resting within the top opening 31 of the pressure release body 60.

Figure 5:
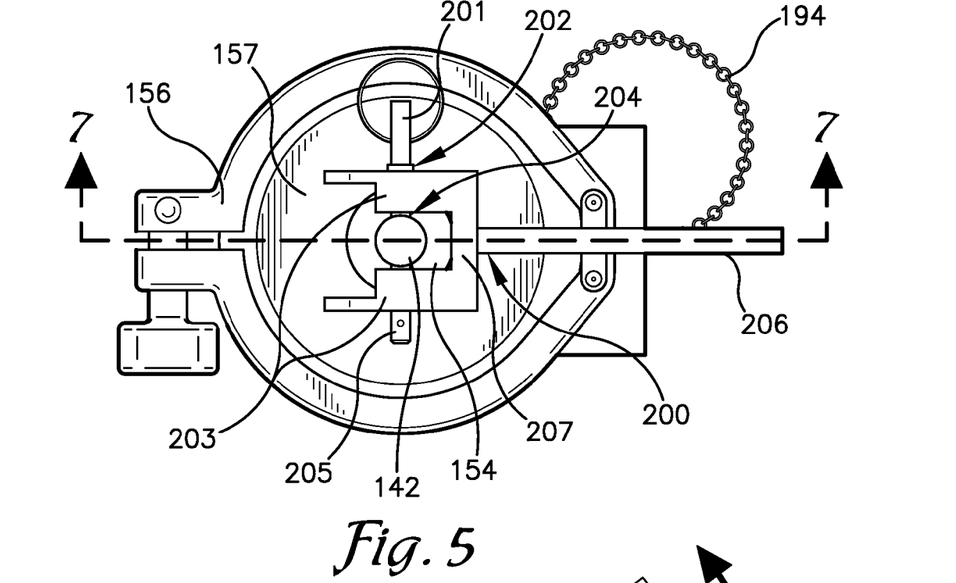
FIG. 5 is a top plan view of a second embodiment of a sanitary valve assembly.
Figure 6:
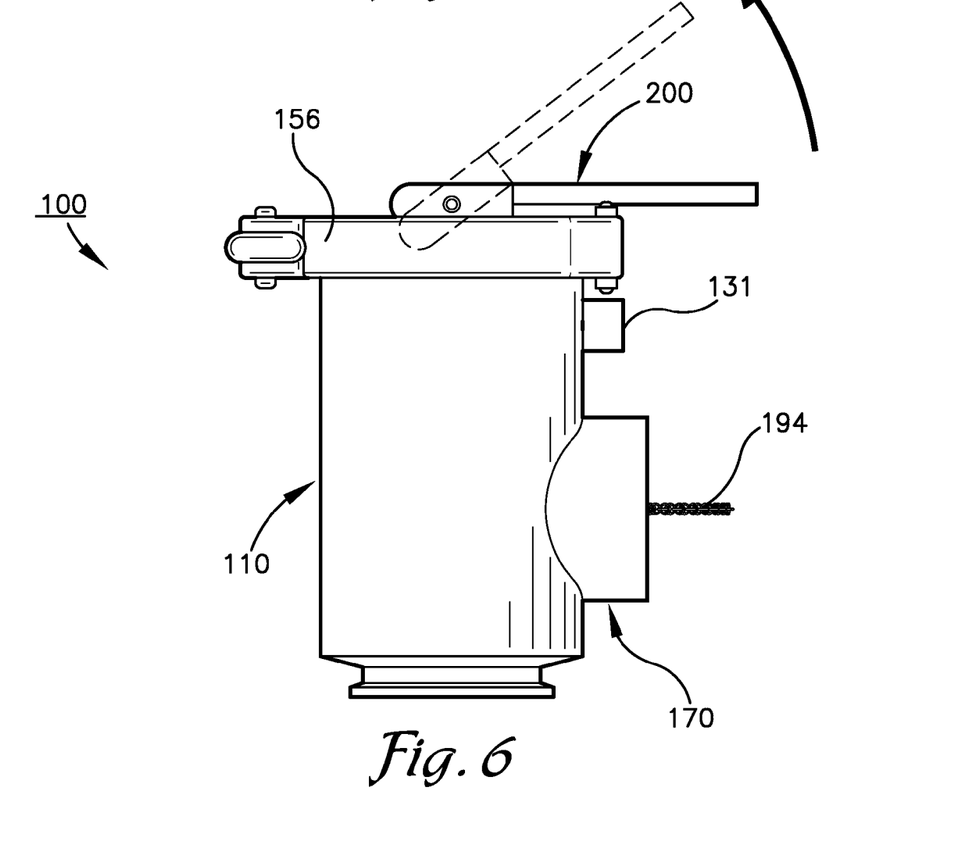
FIG. 6 is a side plan view of the second embodiment of the sanitary valve showing the action of the handle of the sanitary valve assembly shown in FIG. 5.
Figure 7:
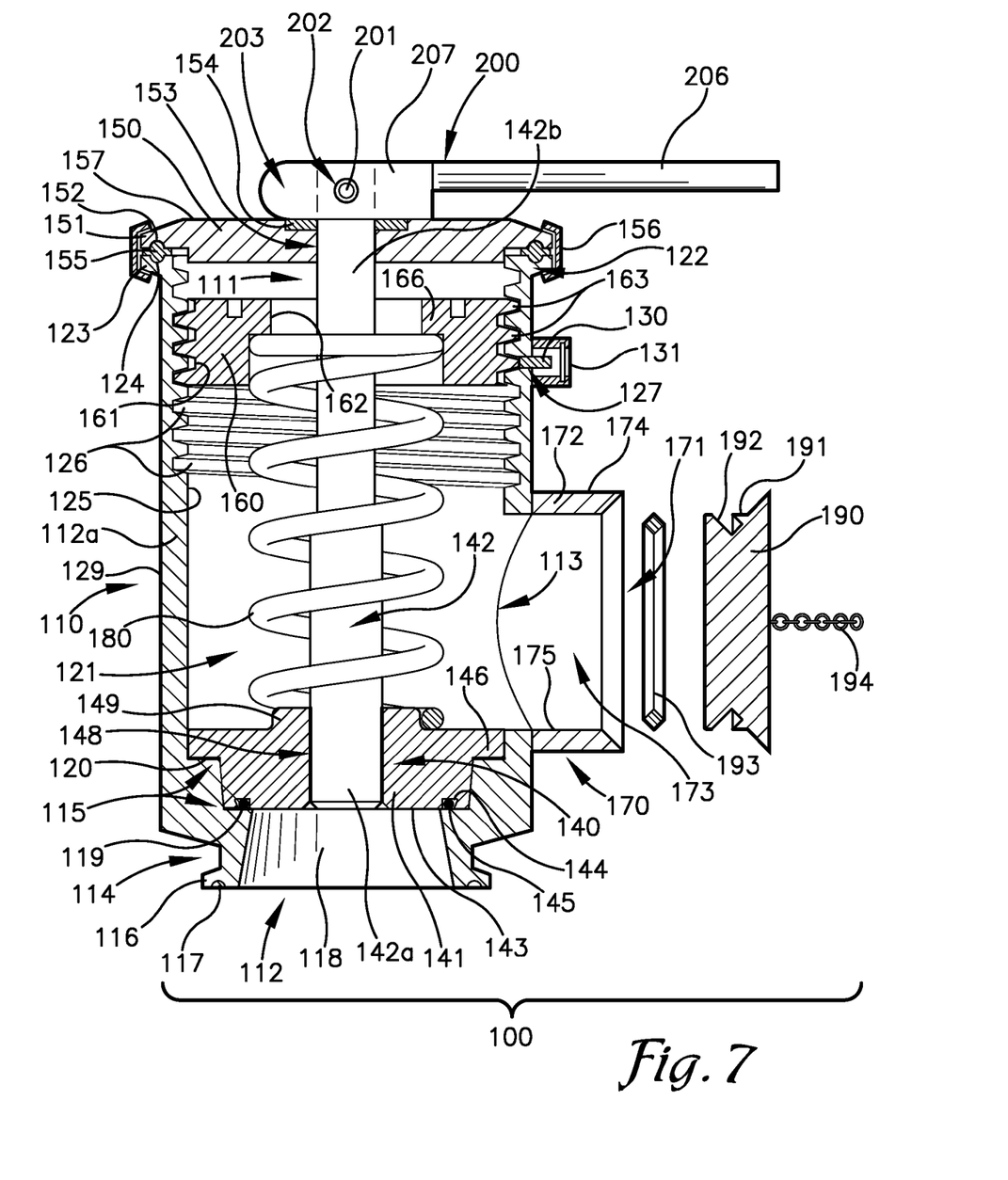
FIG. 7 is a cross-section view of the second embodiment of the sanitary valve assembly shown in FIG. 5 taken along line 7-7.

A second embodiment, referenced in FIGS. 5, 6 and 7, of a valve assembly 100 as shown. The valve assembly 100 comprising a valve body 110 and a pressure release body 170. The second embodiment as shown in FIGS. 5, 6 and 7, show a continuous valve assembly 100 with the valve body 110 and the pressure release body 170 manufactured as one piece. Alternative embodiments could employ the sectioned component of the first embodiment as shown in FIG. 1, with a separable valve body 20 (FIG. 1) and pressure release body 30 (FIG. 1) attached by a connecting means 86 (FIG. 1).

Referring to FIG. 7, the valve body 110 is comprised of a top opening 111, a bottom opening 112 and a side opening 113. A continuous sidewall 112a connects said valve body top opening 110 and said valve body bottom opening 112 and contains said valve body side opening 113. The valve body 110 is generally cylindrical in shape and hollow and may be made of any suitable material including, without limitation, metal such as steel, or plastic such as polycarbonate depending on the application needed for the valve assembly 100. The bottom or bottom surface 114 is comprised of a valve seat 115, a bottom annular lip 116, a bottom annular groove 117 and a port 118. The valve seat 115 is comprised of a lower section 119 and an upper section 120. The lower section 119 of the valve seat 115 has a diameter and circumference less than upper section 120 of the valve seat 115. The bottom opening 112 has a diameter and circumference that is less than the lower section 119 of the valve seat 115. The port 118 provides the means of communicating between the exterior of the valve assembly 100 and the interior or passageway 121 of the valve assembly such that matter or gas can move between the exterior of the valve assembly 100 and the interior 121 of the valve assembly 100 through the port 118.

The top or top surface 122 of the valve body 110 is comprised of an annular lip 123 and an annular groove 124. The interior surface 125 of the valve body 110 has a plurality of threads or screw threads 126 extending from the top opening 111 toward the bottom opening 112. Drilled into the valve body 110 is a void 127 that extends from the interior surface 125 of the valve body 110 through to the exterior surface 129 of the valve body 110. The void 127 is generally of such size to permit the placement of a screw 130 or other securing means that can be adjusted from the exterior of the valve assembly 100.

The guide cylinder 140 is comprised of a piston 141 and a piston rod 142. The piston 141 within the valve body 110 is comprised of a round bottom surface 143 that is greater in diameter and circumference than the bottom opening 112 and port 118. The round bottom surface 143 has an annular groove 144 with a means for creating a seal 145 such as an O-ring or gasket that is in contact with the lower section 119 of the valve seat 115. The piston 141 has an annular second level surface 146 that has a diameter equal to the diameter of the interior surface 125 of the valve body 110. The piston 141 has a circular void 148 through which the piston rod 142 is attached, as shown in FIG. 7, or, alternatively, the guide cylinder 140 may have some other means by which the piston rod 142 is attached to the piston 141. The round top surface 147 of the piston 141 has an annular elevated ridge 149 that supports the means of creating force or spring 180 or may have some other means by which the spring 180 is secured to the guide cylinder 140.

The cap ring 160 is a cylindrical tube having an outer surface 161 and an inner surface 162. The outer surface 161 of the cap ring 160 has threads or screw threads 163 which compliment the threads 126 on the interior surface 125 of the valve body 110. By inserting the cap ring 160 into the top opening 111 of the valve body 110, the cap ring 160 can move up or down with respect to interior surface 125 of the valve body 110 by turning the cap ring 160 clockwise or counterclockwise as required by threads 126 and 163. A screw 130 or other securing means is placed within the screw void 127 to secure the cap ring 160 in a given position by tightening the screw 130 against outer surface 161 of the cap ring 160. The screw 130 is protected from the exterior of the valve assembly 100 by a protective covering 131. The screw 130 allows the cap ring 160 to be secured in place thereby permitting the manufacturer or the purchaser to set the compression force of the spring 180. The set force is the force exerted by the spring 180 against the guide cylinder 140 and, therefore, determines the amount of exterior pressure that is required to dislodge the guide cylinder 140 from the valve seat 115. The cap ring 160 has a seat 166 which receives the top portion of the spring 180.

The means for creating force 180 may be a compression spring, as shown in FIG. 7, or some other means such as a spring loaded cylinder.

The amount of external pressure required to move the guide cylinder 140 such that the piston 141 is unseated from the valve seat 115 can be either decreased or increased by altering the force of the spring 180. The force of the spring 180 is increased or decreased by moving the cap ring 160 either towards the bottom opening 112 of the valve body 110 or towards the top opening 111 of the valve body 110. The cap ring 160 moves by turning the cap ring 160 on threads 126 on the interior surface 125 of the valve body 110 compliment by threads 163 on the outer surface 161 of the cap ring 160. The turning of the cap ring 160 either clockwise or counterclockwise moves the cap ring 160 towards the bottom opening 112 of the valve body 110 thereby increasing the force on the guide cylinder 140 or moves the cap ring 160 towards the top opening 111 of the valve body 110 thereby decreasing the force on the guide cylinder 140.

The pressure release body 170 is connected to the valve body 110 by the side opening 113 of the valve body 110. The pressure release body 170 is generally cylindrical and hollow and has an outer opening 171 and sidewall 172 connecting the side opening 113 with the outer opening 171. The pressure release body 170 may be continuous with the valve body 110 as shown in FIG. 7 in the second embodiment or may be separable as shown in FIG. 1 of the first embodiment.

A seal cap 190 is fitted on the outer opening 171 of the pressure release body 170. The seal cap 190 can fit into the interior or passageway 173 of the pressure release body 170 or can fit like a cap covering the outer opening 171 of the pressure release body and extending over a portion of the exterior surface 174 of the pressure release body 170. An annular groove 192 is provided on the side surface 191 of the seal cap 190 which is frictionally fitted inside of the side opening 172 of the pressure release body 190. An O-ring or gasket 193 is placed within the annular groove 192 of the seal cap 190. When the seal cap 190 is placed within the side opening 171 of the pressure release body 170 a frictional seal is created between the gasket 193 and the interior surface 175 of the pressure release body 170. If the seal cap 190 was designed to extend over the outer opening 171 and encircle the exterior surface 174 of the pressure release body 170 then the annular groove 192 would be placed such that the gasket 193 creates a frictional seal against the exterior surface 174 of the pressure release body 170.

A chain 194 or other means of attaching the seal cap 190 to the valve assembly 100 may be used to prevent the seal cap 190 from being lost or projected when the seal cap 190 becomes dislodged following a breach of the valve assembly 100 from pressure.

A lid 150 is comprised of an annular lip 151, an annular groove 152, a circular void 153, and a rubber washer 154. The lid 150 rests on the top surface 122 of the valve body 110. The annular groove 152 of the lid 150 lines up with the top annular groove 124 of the valve body 110. An O-ring or gasket 155 is placed between the annular groove 152 of the lid 150 and the top annular groove 124 of the valve body 110. A connecting means 156, such as a clamp, brace, band or collar, or any other suitable connecting means, is used to attach the annular lip 151 of the lid 150 to the top annular lip 123 of the valve body 110. The circular void 153 is of the same diameter as the piston rod 142 such that the piston rod 142 extends through the circular void 153 and out the top surface 157 of the lid 150. A rubber washer 154, or other sealing means, is attached to the top surface 157 of the lid 150 to provide a sealing engagement between the lid 150 and the piston rod 142.

A handle 200 is attached to the top portion of the piston rod 142 by means of a pin 201 or other securing means. The handle 200, as shown in FIG. 5, is comprised of a handle rod 206 and a U-shaped locking nut 207. The handle rod 206 and U-shaped locking nut 207 may alternatively be either one unit or two separable pieces. The U-shaped locking nut 207 has two prongs 203, with a drilled void 202 in both of the two prongs 203 that lines up with a drilled void 204 though the top portion of the piston rod 142. A pin 201, or other securing means, is placed through the void 202 of prongs 203 and the void 204 of the piston rod 142 to secure the handle 200 to the piston rod 142. A locking means 205 secures the pin 201 in place. The handle 200 allows for manual disengagement of the piston 142 from the valve seat 115 in order to release external pressure from the substrate or vessel, as shown in FIG. 6.

The valve assembly 100 can be disassembled, inspected and cleaned while the valve assembly 100 remains attached to the substrate or vessel and without releasing the force of the spring 180 on the guide cylinder 160. The interior 121 of the valve body 110 and the interior 173 of the pressure release body 170 can be accessed by removing the lid 150 and/or the seal cap 190. The unseating of the piston 142 of the guide cylinder 160 from the valve seat 115 of the valve body 110 results in pressurized matter, including liquid, gas, solid particles, and other potential contaminants, entering the interior 121 of the valve body 110 and the interior 173 of the pressure release body 170 such that the seal cap 190 is ejected from the outer opening 171 of the pressure release body 170 providing a visual cue that valve assembly 100 has been breached. The seal cap 190 is dislodged in a non-destructive manner and can easily be reinserted into the pressure release body 170 to reuse the valve assembly 100.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

We claim:

1. A sanitary valve assembly for connection to a pressurized vessel, the valve assembly having a guide cylinder that is openable in response to a pre-selected pressure being attained in the pressurized vessel to release the pressure in the vessel, the valve assembly being divisible to permit access into the valve assembly interior for inspection and/or cleaning while retaining the pressurized vessel in a pressurized state, the sanitary valve assembly comprising:

a valve body comprising a continuous sidewall forming a passageway between a top opening and a bottom opening said passageway having an interior surface, said valve body bottom opening comprising a valve seat, said interior surface having a screw thread extending into said passageway from said valve body top opening, said valve body bottom opening comprising a bottom surface having a circumferential annular lip thereon having an annular groove therein for reception of a gasket for providing a sealing connection of said valve body bottom with a vessel, said valve body top opening comprising a top surface having a circumferential annular lip thereon having an annular groove therein for reception of a gasket for providing a sealing connection of said valve body top opening with said pressure release body bottom opening, a guide cylinder within said passageway yieldingly urged against said valve seat, a cap ring having a screw thread thereon for screwable insertion into said screw thread of said valve body, said cap ring having a seat on a bottom surface thereof, a spring captured between said cap ring and said guide cylinder for urging said guide cylinder against said valve seat, said spring being variably compressible by repositioning of said cap ring along said interior surface screw thread for selection of a pressure at which said guide cylinder is urged away from said valve seat by a pressure within the vessel, a pressure release body having a continuous sidewall forming a passageway between a top opening and a bottom opening, said pressure release top opening having a seal cap thereon frictionally held to said sidewall, said seal cap being dislodgeable from said pressure release body top opening in response to an increase of pressure within said valve assembly, and a connecting means for joining said valve body top opening to said pressure release body bottom opening for communication of pressure between said valve body passageway with said pressure release body passageway, said connecting means providing for separation of said valve body from said pressure release body for inspection and/or cleaning said valve body passageway and said pressure release body passageway while said cap ring maintains said guide cylinder urged against said valve seat to retain the pressurized vessel in a pressurized state.

2. The valve assembly as claimed in claim 1, wherein said pressure release body bottom opening comprises a bottom surface, having an annular lip and a groove therein for receiving a gasket for providing a sealing connection of said pressure release body bottom opening with said valve body top opening.

3. The valve assembly of claim 1, wherein said pressure release body further comprises a stop bar extending into said passageway, said stop bar having a void therein for reception therethrough of a projection extending from said seal cap, said projection having a stopping means thereon to retain said seal cap in connection with said pressure release body upon dislodgement of said seal cap from said pressure release body.

4. The valve assembly of claim 3, wherein said projection extending from said seal cap is a tube having a threaded inner wall and said stopping means is a threaded rod for insertion into said threaded inner wall.

5. The valve assembly of claim 3, wherein said connecting means is a clamp, a brace, a band, or a collar.

6. A sanitary valve assembly for connection to a vessel, the valve assembly being openable in response to a pre-selected pressure being attained in the vessel to release the pressure in the vessel, the valve assembly comprising:

a cylindrical valve body having a generally continuous sidewall defining a central passageway, a top opening, a bottom opening and a side opening in said valve body sidewall, an interior surface of said cylindrical valve body adjacent said top opening having a screw thread thereon, a valve seat formed in said bottom opening, a cap ring having a screw thread thereon for screwable insertion of said cap ring into said interior surface screw thread and a seat on a bottom surface of said cap ring, a guide cylinder comprised of a piston rod having a top end and a bottom end connected to a piston, said piston rod extending from said piston through a central void in said cap ring and extending out said top opening of said valve body to position said piston rod top end exterior of said valve body, a spring compressed between said cap ring seat and a piston top surface to yieldingly urging said piston against said valve seat, said cap ring being repositionable along said interior wall screw thread to change the urging force of said spring in biasing said piston against said valve seat, said repositioning of said cap ring allowing a user to pre-select a pressure to be attained in the vessel prior to said yielding of said piston, a pressure release body having a continuous sidewall connected to said side opening, a seal cap for frictional connection to said pressure release body sidewall, said seal cap being dislodgeable from said pressure release body sidewall in response to an increase of pressure within said valve assembly, a lid for covering said top opening, said lid having a void for passage of said piston rod top end therethrough, and a handle connected to a top end of said piston rod to allow a user to move said handle to lift said piston from being urged against said valve seat to effect manual release of pressure in the vessel.

7. The valve assembly of claim 6 further comprising a connecting means for joining said valve body top opening to said lid said connecting means providing for separation of said lid from said valve body for inspection and/or cleaning of said valve body passageway.

8. The valve assembly of claim 6, wherein said valve body bottom opening further comprises a bottom surface having a circumferential annular lip thereon having an annular groove therein for reception of a gasket for providing a sealing connection of said valve body bottom with a vessel.

9. The valve assembly of claim 7, wherein said connecting means is a clamp, a brace, a band, or a collar.

* * * * *